Feb. 3, 1970 — R. H. FERNEAU — 3,493,262
CART HAVING COLLAPSIBLE LEGS
Filed March 13, 1968 — 3 Sheets-Sheet 1
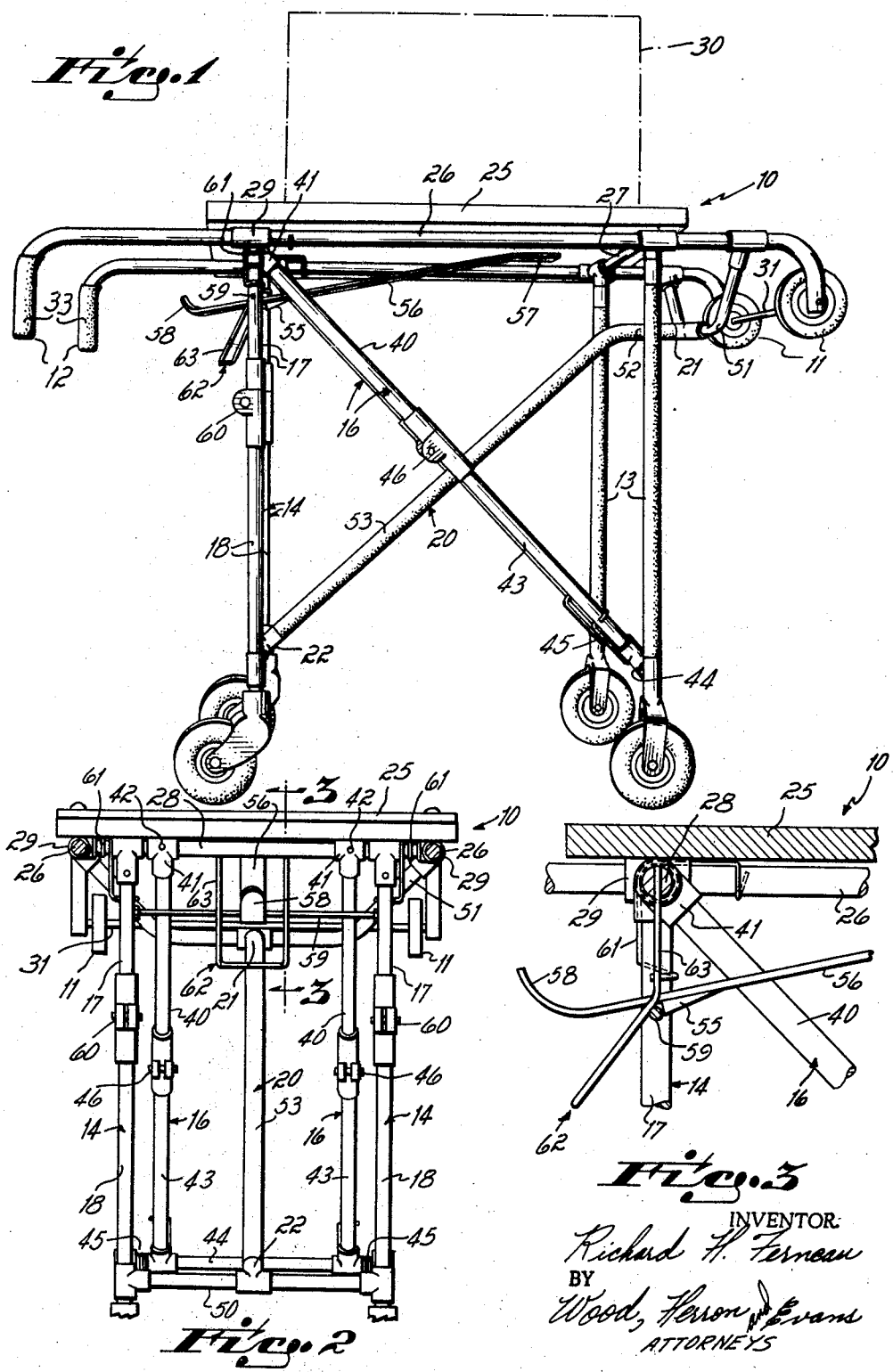
INVENTOR.
Richard H. Ferneau
BY
Wood, Herron & Evans
ATTORNEYS

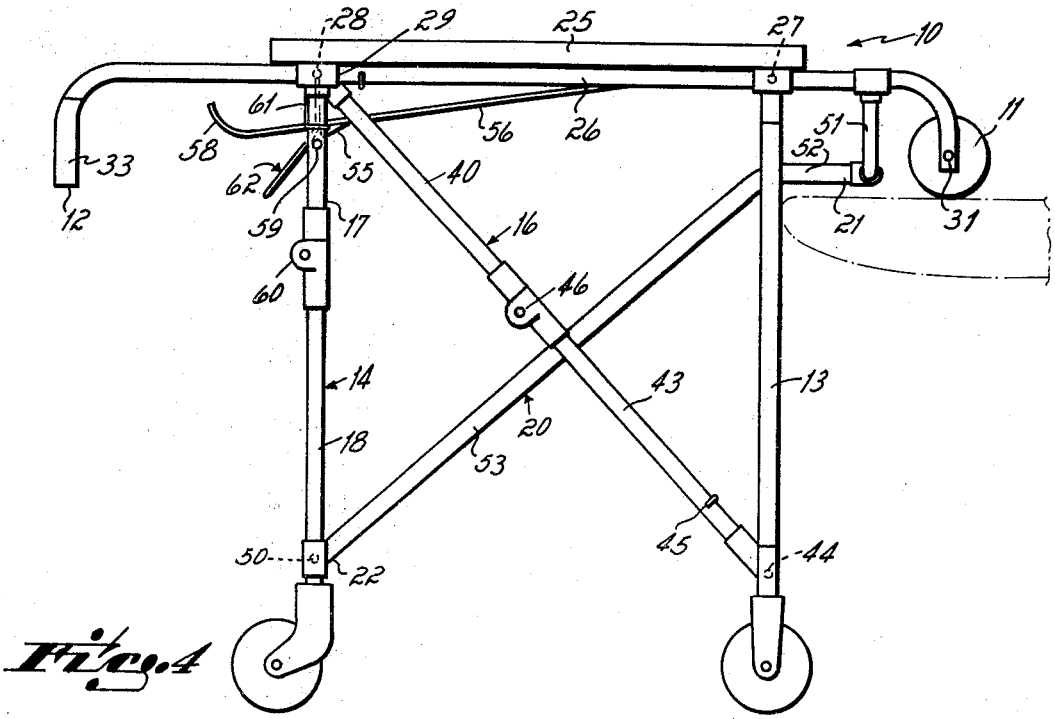
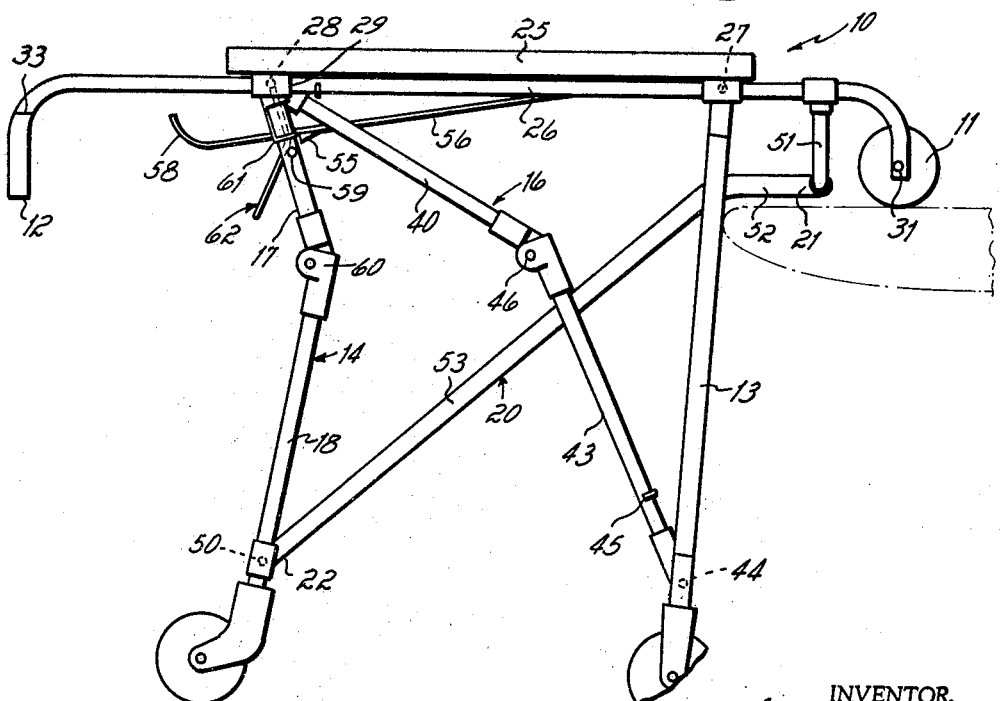

Feb. 3, 1970   R. H. FERNEAU   3,493,262
CART HAVING COLLAPSIBLE LEGS
Filed March 13, 1968   3 Sheets-Sheet 3
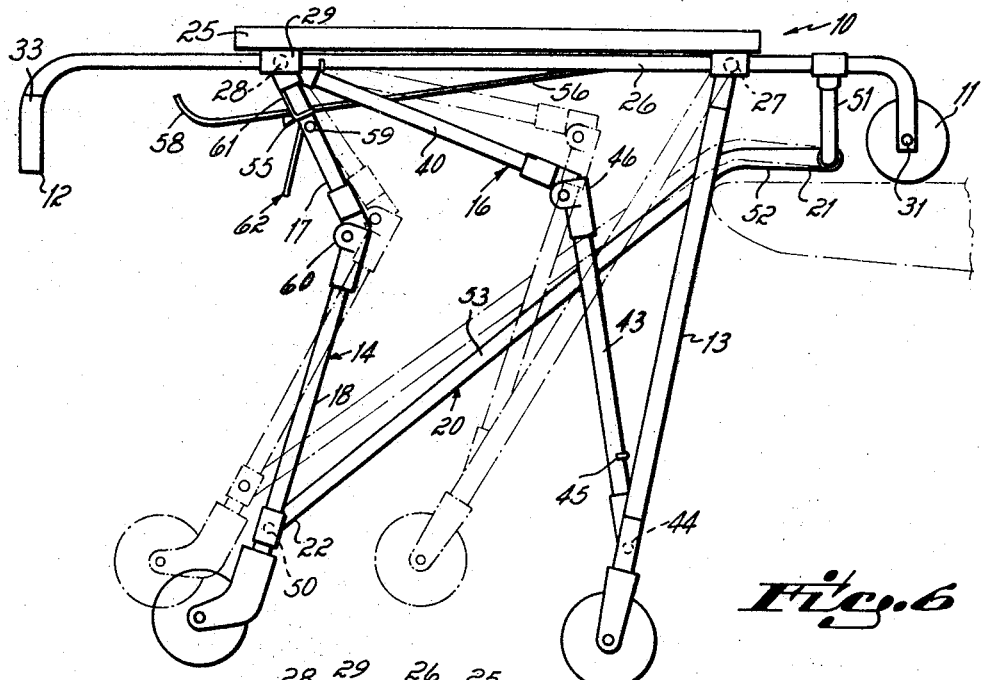
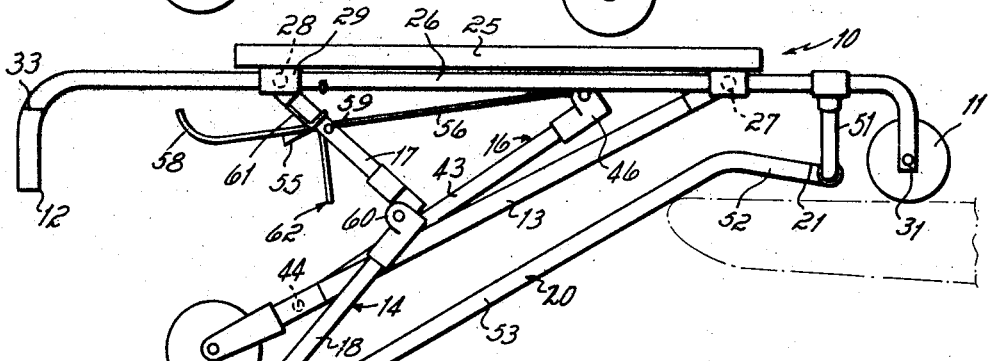
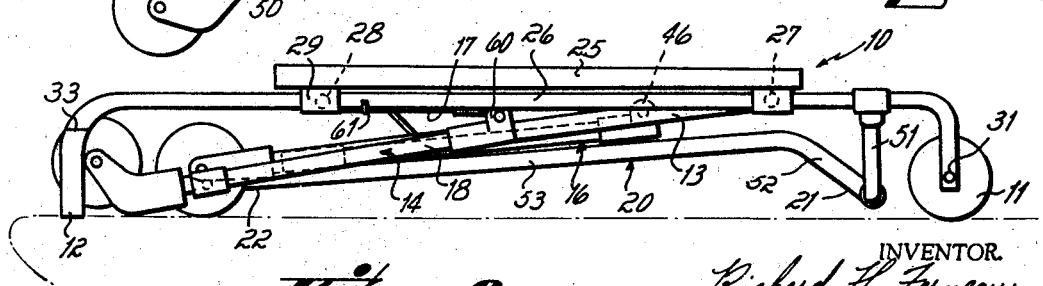
INVENTOR.
Richard H. Ferneau
BY
Wood, Herron & Evans
ATTORNEYS

United States Patent Office 3,493,262
Patented Feb. 3, 1970

3,493,262
CART HAVING COLLAPSIBLE LEGS
Richard H. Ferneau, Washington Court House, Ohio, assignor to Burt Weil, Cincinnati, Ohio
Filed Mar. 13, 1968, Ser. No. 712,843
Int. Cl. A61g *1/02;* B62b *3/02*
U.S. Cl. 296—20                10 Claims

ABSTRACT OF THE DISCLOSURE

A cart having front legs which are swingable rearwardly to a generally horizontal position and rear legs each of which is formed by an upper member swingable toward the front of the cart and a lower member pivotable to the upper member, the lower member being swingable toward the rear of the cart.

---

This invention relates to a cart having a bed from which depend vertical legs, the legs being adapted to be swung to a position underlying the bed whereby the cart can be thrust into a vehicle. The first such carts of this type are the subject of Weil Patents Nos. 2,841,438, 2,877,047, and 2,877,048. In the carts of those patents, auxiliary wheels are mounted on the front of the cart slightly below the level of the bed. The carts have depending legs which are rigid and which are adapted to be swung rearwardly as the cart is thrust into a vehicle with the operator standing at the rear of the cart grasping handles to support the rear of the cart. The portion of the bed projecting rearwardly from the point of connection to the rear legs of the bed is approximately the length of the legs so that when the legs are swung to their horizontal position they do not project rearwardly of the handles. The objective of the present invention has been to provide a cart wherein the dimension of the cart rearwardly of the rear legs is much shorter than the length of the rear legs, the rearlegs nevertheless being adapted to be collapsed without projecting beyond the rear end of the cart.

This feature of the invention permits the cart to have a longer wheel base and hence greater stability or, alternatively, permits the cart with the wheel base of the original Weil patents to have a shorter overall length. The first of these forms is particularly useful in elongated carts for handling bodies for mortuary and ambulance work. The second of these forms is particularly useful in providing a cart for handling inanimate articles, as, for example, heavy articles of merchandise which a salesman might transport from office to customer. As to the latter, the foreshortened cart is particularly useful in traveling in elevators and in minimizing the projecting structure during sales demonstrations. Further, the cart is adaptable for riding in a shorter vehicle space as, for example a compact station wagon.

The foregoing objective of the invention is attained in part by providing a cart of the type described in which each rear leg is formed of an upper member which is pivoted to swing forwardly and a lower member which is pivoted to the upper member to swing rearwardly. Thus, upon collapse, the upper and lower members of each rear leg form a V and hence the distance which the rear legs must project rearwardly of their connection to the bed of the cart is shortened by a distance which is approximately three times the length of the upper member.

Another objective of the invention has been to provide a release mechanism by which the braces for the front and rear legs can be released by an operator standing at the rear of the cart grasping the handles of the cart in both hands. Specifically, the mechanism includes a lever which is pivotal and when pivoted causes the upper member of the rear leg to swing forwardly and causes a toggle brace for the front leg to be released.

It has been another objective of the invention to provide a latch associated with the release mechanism, the latch normally blocking movement of the release mechanism. In the preferred form of the invention, the release mechanism is operable by the knee of the operator and the latch includes an arm which is engaged by the knee of the operator when it is moved into position to operate the release mechanism.

These and other objectives of the invention will become more readily apparent from the following detailed description taken in conjunction with the accompanying drawings in which:

FIG. 1 is a perspective view of a cart of the present invention;

FIG. 2 is a perspective view partly in section taken from the rear of the cart;

FIG. 3 is a cross sectional view taken along lines 3—3 of FIG. 2; and

FIGS. 4-8 are side elevational views of the cart illustrating the sequence of steps in collapsing the legs of the cart to enable it to be thrust into a station wagon or the like.

Referring to FIG. 1 the cart includes a bed 10 having auxiliary wheels 11 mounted at the forward end and handles 12 mounted at the rearward end. A pair of front legs 13 are mounted adjacent the auxiliary wheels at the front end of the cart and have wheels at their lower ends. A pair of rear legs 14 are mounted adjacent the handles at the rear end of the cart and have casters at their lower ends. The front legs 13 are braced in a vertical attitude by a pair of toggle or over center braces 16. The rear legs are each formed of an upper member 17 which is pivoted to the bed 10 and a lower member 18 which is pivoted to the lower end of the upper member. The rear legs are braced in part by a diagonal rod 20 extending from the front of the bed indicated at 21 to the lower ends of the rear legs indicated at 22.

More specifically, the bed is formed by a platform 25 which is secured to longitudinal tubes 26. At the front of the cart the longitudinal tubes are interconnected by a transverse tube 27 and at the rear by a cross bar 28. The cross bar 28 is journalled for rotation in T-fittings 29 on either side of the cart. In the embodiment illustrated, this bed of the cart is designed for carrying inanimate articles such as shown in broken lines at 30 in FIG. 1. It is to be understood that the overall dimensions of the cart could be lengthened and a mattress structure used to adapt the bed of the cart for use in ambulance or mortuary work of the type described in the earlier Weil patents.

The forward ends of the tubes 26 are bent downwardly and support an axle 31 to which are mounted the auxiliary wheels 11. The lowermost surface of the auxiliary wheels 11 is spaced down from the tubes 26 about six inches to provide a space between that lowermost surface and the tubes within which the legs can lie when the cart is in a collapsed condition as illustrated in FIG. 8.

The opposite ends of the tubes 26 are also bent downwardly and are provided with grips 33 to form the handles 12. Referring again to FIG. 8, it can be observed that when the cart is in its collapsed condition, the turned down ends of the handles provide a support for the cart which takes the weight of the cart off the collapsed legs and their pivot points and provides a friction engagement with the deck of the vehicle in which the cart is lodged and tends to prevent the cart from moving about when it has been placed in the vehicle.

Each toggle brace 16 includes upper arms 40 whose upper ends 41 are fixed as by the pins 42 to the cross bar 28 so that they rotate with the cross bar 28. The braces further include lower arms 43 which are rotatably mounted on a cross rod 44 secured to the lower ends of the front legs 13. A spring 45 is secured between each leg and a lower arm 43 of the toggle brace to urge the brace to the erect condition as viewed in FIG. 1. The arms 40 and 43 are interconnected by an over center or butt type hinge 46.

The lower end of the brace 20 is rotatably mounted on a cross rod 50 which interconnects the lower ends of the rear legs 14. The upper end of the brace is secured to a U-shaped bracket 51 which is fixed to the longitudinal tubes 26. The pivot point of the diagonal brace 20 is well below the bed 10 but above the lowermost surface of the auxiliary wheels 11. The point is lowered from the plane of the bed in order to permit as long a wheel base as possible while still permitting the rear legs to fold within the confines of the handles 12. On the other hand, the pivot point must be above the lowermost surface of the auxiliary wheels so as to avoid interference by the tail gate of the vehicle as the cart is thrust into the vehicle. Further, the diagonal brace is formed by a horizontal section 52 and an inclined section 53. The horizontal section extends approximately to the plane defined by the front legs and the inclined section 53 extends down to the cross rod 50 at the lower ends of the rear legs. The horizontal section is provided so that the brace 20 will be disposed rearwardly a distance sufficient to avoid interference with the tail gate of the vehicle.

The rear legs are releasably braced or latched in their vertical position by a latch 55 mounted on a leaf spring 56. One end 57 of the leaf spring is fixed to the bottom surface of the platform 25 and the other end projects as an arm 58 generally horizontally beyond the plane of the rear legs where it can be engaged by the knee of the operator. The latch 55 engages a transverse latch rod 59 extending between upper members 17 of the rear legs 14 to block forward pivotal movement of the upper members toward collapsed condition.

The upper and lower members 17 and 18 respectively of the rear legs 14 are connected by over center butt type hingles 60, the hinge elements being urged into vertical butting relation by springs 61 connected between the longitudinal tubes 26 and the upper members 17.

The transverse latch rod 59 is engaged by a lever 62 which is fixed to the cross bar 28 and depends from it. The lever 62 is U-shaped and has generally vertical legs 63 which straddle the leaf spring 56 which supports the latch 55. When the latch is moved out of engagement with the rod 59 and the lever 62 swung in a counterclockwise direction, (FIGS. 3 and 4) the braces to both front and rear legs are released. The rotation of the lever 62 rotates the cross bar 28 to which the toggle arms 40 are fixed thereby releasing the toggle brace 16 for the front legs. The engagement of the lever 62 with the transverse bar 59 forces the upper members 17 of the rear legs to swing in a counterclockwise direction thereby releasing the over center butt hingle 60 and permitting the rear legs to collapse.

OPERATION

In the operation of the invention, the cart is rolled up to the tail gate of a station wagon, for example, and the auxiliary wheels engage the tail gate to support the front end of the cart. The operator, grasping the handles 12 at the opposite end of the cart, supports the opposite end of the cart. While supporting the cart, the operator brings his knee into engagement with the latch arm 58 and lever 62. The upward movement of the latch arm unlatches the transverse rod 59 and permits the lever 62 to drive the transverse rod in a counterclockwise direction. The counterclockwise movement of the rod 59 and the cross bar 28 releases the braces on the rear and forward legs of the cart. Simultaneously, the operator thrusts the cart forwardly into the vehicle so that the force of the tail gate on the forward legs of the vehicle causes the forward legs to swing upwardly. Further movement of the cart into the vehicle causes the tail gate to engage the diagonal brace 20 swinging it upwardly and causing the collapse of the rear legs to the V configuration illustrated in FIGS. 7 and 8. As the legs are brought into position of FIG. 8, continued movement of the cart forwardly into the vehicle is all that is required in order to load the cart into the vehicle. Once in the vehicle, the engagement of the handles 12 with the deck of the vehicle tends frictionally to maintain the cart in position.

I claim:
1. A cart comprising:
a horizontal bed frame.
auxiliary wheels mounted at one end of said bed frame and handles mounted at the other end of said bed frame,
two front legs pivotally mounted to said bed frame adjacent said auxiliary wheels for swinging movement toward said handles,
a first releasable brace connected between said frame and said front legs to maintain said legs vertical,
two vertical rear legs mounted adjacent said handles, each said rear leg comprising—
an upper member pivoted to said bed frame for swinging movement toward said auxiliary wheels, and a lower member pivoted to the lower end of said upper member for swinging movement toward said handles,
and a releasable latch means normally maintaining said rear legs vertical,
a generally diagonal rod pivoted at its lower end to the lower ends of said rear legs and pivoted at its upper end to the front portion of said frame,
whereby as said brace and said latch means are released, said front legs will swing rearwardly, and said rear legs will collapse in a V with said leg members lying close to said bed frame.
2. A cart according to claim 1 further comprising means mounted at the rear of the cart and associated with said braces to release said braces upon actuation by an operator standing at the rear of the cart.
3. A cart according to claim 1 in which said second brace includes a butt type hinge joining said upper and lower members, and latch means normally holding said hinge in butting relation.
4. A cart according to claim 1 in which the other end of said diagonal rod is pivoted to said bed at a point slightly above the lowermost surface of said auxiliary wheels and approximately midway between said wheels and front legs.
5. A cart according to claim 4 in which diagonal rod extends horizontally rearwardly from its upper pivot point to the plane defined by said front legs and then downwardly to said rear legs.
6. A cart according to claim 1 further comprising a single lever pivoted at the rear of said cart and operably associated with said first and second releasable braces to release said braces upon pivoting said lever.
7. A cart according to claim 6 further comprising a releasable latch blocking the pivoting of said lever.
8. A cart according to claim 7 in which said lever has a generally vertical arm projecting downwardly between said rear legs, and said latch having an arm disposed above said lever arm and projecting rearwardly from said rear legs,
said arms being engageable by the knee of the operator to pivot said latch upwardly to release said lever and thereafter to pivot said lever forwardly to release said braces.
9. A cart comprising:
a horizontal bed, auxiliary wheels mounted at the front end of said bed and handles mounted at the rear end of said bed, two front legs pivoted to said bed for swinging movement toward said handles, said legs having a cross rod interconnecting them at their lower ends, an upper cross bar journalled in said bed rearwardly of said front legs, two rear legs pivotally mounted on said cross bar and having a lower cross rod interconnecting them at their lower ends, said rear legs each having an upper member swingable toward said auxiliary wheels and a lower member pivoted to the lower end of said upper member for swinging movement only toward said handles, a diagonal brace rod pivoted between the front end of said bed and said cross rod on said rear legs, a diagonal toggle brace having upper arms fixed to said upper cross bar and lower arms connected to the cross rod on said front legs, an actuator lever fixed to said upper cross bar and engageable with said rear legs whereby pivoting said lever rotates said cross bar to release said toggle brace, and rotates the upper members of said rear legs to collapse them.

10. A cart according to claim 9 and a releasable latch blocking the pivoting of said lever.

References Cited

UNITED STATES PATENTS

| | | | |
|---|---|---|---|
| 2,841,438 | 7/1958 | Weil | 296—20 |
| 2,877,048 | 3/1959 | Weil | 296—20 |
| 2,877,047 | 3/1959 | Weil | 296—20 |
| 3,088,770 | 5/1963 | Weil | 296—20 |
| 3,223,429 | 12/1965 | Hastings | 296—20 |

RICHARD J. JOHNSON, Primary Examiner

U.S. Cl. X.R.

280—41